US012145174B1

(12) United States Patent
McClosky et al.

(10) Patent No.: US 12,145,174 B1
(45) Date of Patent: Nov. 19, 2024

(54) DYNAMIC ROBOT CONTROL FOR SORTATION

(71) Applicant: Amazon Technologies, Inc., Seattle, WA (US)

(72) Inventors: Benjamin McClosky, Woodinville, WA (US); Andrea Thelen, Westphalia, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/214,354

(22) Filed: Jun. 26, 2023

(51) Int. Cl.
*B07C 3/00* (2006.01)
*B07C 3/08* (2006.01)

(52) U.S. Cl.
CPC ................ *B07C 3/005* (2013.01); *B07C 3/08* (2013.01); *B07C 2501/0063* (2013.01)

(58) Field of Classification Search
CPC .. B07C 3/005; B07C 3/006; B07C 2501/0063
USPC .......................................................... 209/509
See application file for complete search history.

(56) References Cited

U.S. PATENT DOCUMENTS 10,994,872 B2 * 5/2021 Mattern ............... G06Q 10/087
11,590,659 B2 * 2/2023 Peterson ................ B25J 9/1697

* cited by examiner

*Primary Examiner* — Michael McCullough
*Assistant Examiner* — Molly K Devine
(74) *Attorney, Agent, or Firm* — K&L Gates LLP

(57) ABSTRACT

Systems and methods of dynamically controlling robots are described. A first robot may be controlled to move a pod to a cart-filling station. A first subset of destinations for the cart-filling station may be determined. First control instructions may be sent to a robotic sortation device at the cart-filling station. The first control instructions may be effective to allocate the first set of destinations to the robotic sortation device. A second robot may be controlled to move a first cart associated with a first destination of the first set of destinations to the cart-filling station. The robotic sortation device may select a first item from the pod associated with the first destination. The robotic sortation device may place the first item in the first cart and the second robot may be controlled to remove the first cart from the cart-filling station.

20 Claims, 10 Drawing Sheets

| Scenario | Cart Request Policy | Mobile Buffer Request Policy |
| --- | --- | --- |
| Scenario 1 | random by destination CDF | max pile on |
| Scenario 2 | random by destination CDF | oldest |
| Scenario 3 | destination with oldest package in storage | max pile on |
| Scenario 4 | destination with oldest package in storage | oldest |

FIG. 8

DYNAMIC ROBOT CONTROL FOR SORTATION

BACKGROUND

In a heterogeneous robotic processing facility, robotic drive systems can be used to move items and/or containers of items from one location to another. Robotic arms can be used to sort items by removing an item from one location and placing the item in a different, target location. Systems of such robots can be designed and deployed to accomplish a variety of tasks such as item retrieval, processing, and sortation.

BRIEF DESCRIPTION OF DRAWINGS

FIG. 8 is a table depicting example policies that may be used to coordinate arrival of robots carrying pods and carts to a cart-filling station, in accordance with various aspects of the present disclosure.

DETAILED DESCRIPTION

Figure 1:
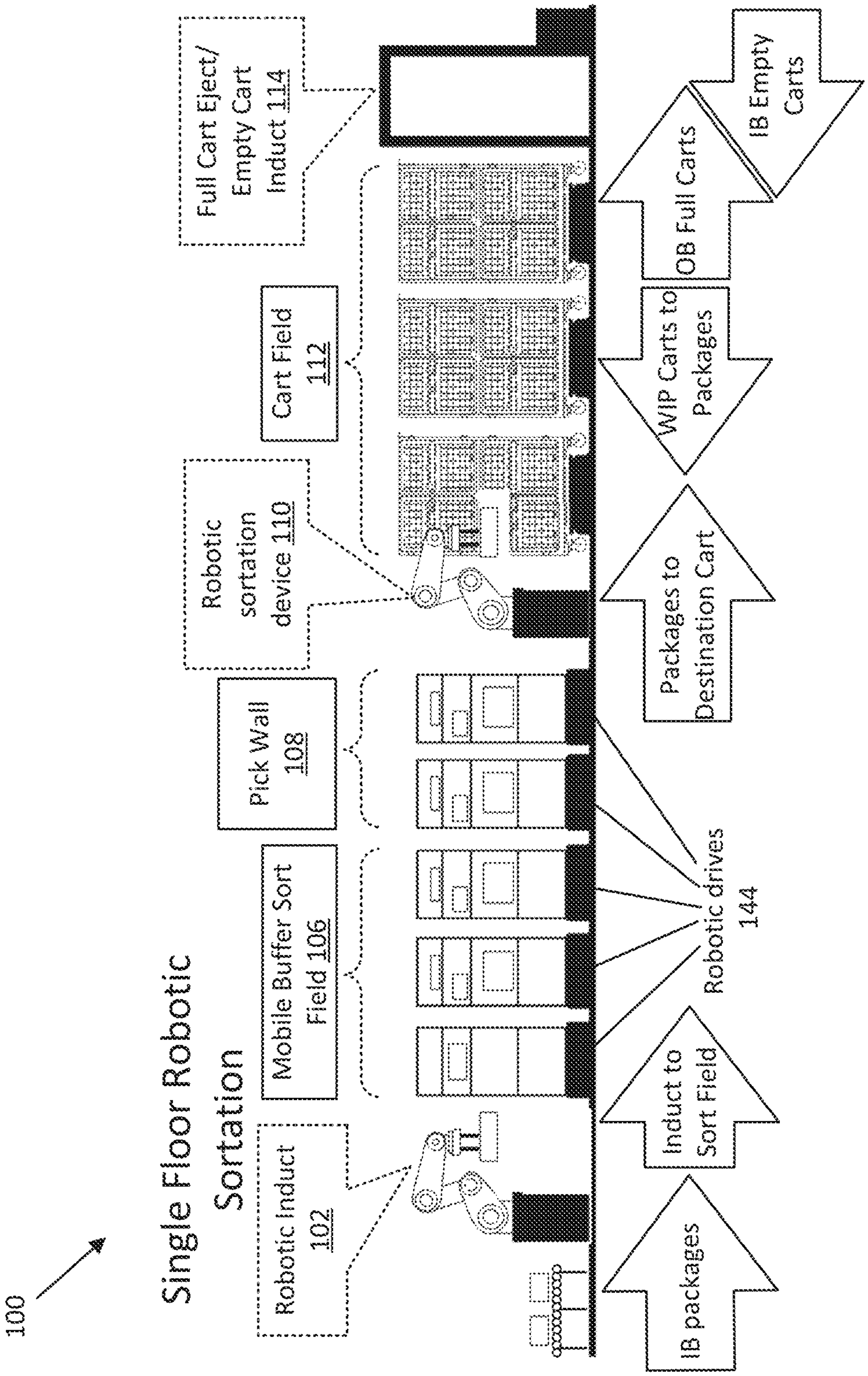
FIG. 1 depicts a diagram illustrating a single floor robotic sortation system, according to various aspects of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, robotic picking and sortation systems may be used in large-scale inventory processing environments in which a large number of items are received, processed, sorted, and sent out. For example, large-scale delivery and inventory management systems may use fulfillment centers and other large warehouses that may serve as part of the supply chain and can serve as a hub for logistics and processes used to get items from third party sellers to the purchaser. In some cases, received items at a robotic fulfillment center may be placed in robot-controlled storage fields. For example, items may be stored in containers (sometimes referred to as "pods"). When an item is ordered and needs to be processed for shipment, instead of having a human worker find and walk to a storage shelf in a warehouse to "pick" the item, robotic drives may be controlled to select the pod (or other container) storing the item and may transport the pod to a pick station where a worker or another robot may pick the item from the pod and send the item for downstream processing. After items in such facilities are packaged and addressed for delivery, the packages may be sorted into carts (e.g., any sort of container or temporary storage unit used to hold packages prior to shipment), with the packages in a single cart being destined for the same delivery location. Accordingly, in some examples, there may be a distinction between different robot-controlled operations in such facilities. A "picking" operation may refer to robots moving a pod from a robot-controlled storage field to a pick station and/or selection of the item at the pick station. A "sortation" operation may be downstream of the "picking" operation and may refer to sorting items and/or packages of items into carts or other containers that are bound for the same truck, freight unit, or other "destination." In some examples, such containers may be said to be "destination pure" as all items within the container may be destined for the same downstream location (whether such location is an intermediate location, such as a warehouse or last-mile delivery center, or the terminal location (e.g., a delivery address of a purchaser)). It should be noted that sortation may be used in other contexts beyond commercial delivery systems and in general may be used whenever heterogeneous items are to be sorted along some dimension of sortation (e.g., type, class, size, delivery destination, color, functionality, etc.). Accordingly, although many of the examples described herein use a package delivery example, the various dynamic allocation techniques used to control robotic resources may instead be deployed in other object-picking and/or sortation contexts.

Highly-automated fulfillment centers, such as those described herein, may experience different load and/or processing demands over time as the number of items to be picked and/or sorted for a given item order load may be highly variable (e.g., due to time of day, day of week, seasonality, variable user demand, etc.). In some instances, a processing bottleneck may occur at the sortation stage. For example, a surge in item orders may cause a bottleneck in the number of robots available to sort items (e.g., robotic arms, gantries, etc.) and/or to transport pods to sortation stations and/or may cause congestion on the processing floor where such robots must avoid collisions with one another. In some examples, the robotic sortation stations may request work from both a package buffer and a cart buffer. The package buffer refers to a field of pods (e.g., mobile shelving/container units that hold packages). Robotic drives are sent control instructions causing them to find the appropriate pod and transport it to the requesting robotic sortation station. Similarly, the cart buffer refers to a field of carts which are transported to and from the robotic sortation stations. Empty carts that are assigned to a particular destination are transported to the robotic sortation station and full carts are transported from the robotic sortation station (e.g., to be loaded onto vehicles for delivery). Robots working within the cart and package buffers have uncertain mission times to deliver a package or cart to a robotic sortation station due to the dynamic nature of the environment. Described herein is a robot controller that manages requests so that the correct packages and carts are presented to the appropriate robotic sortation station at the appropriate time. The robot controller also manages utilization of the cart and pick walls (e.g., the positions at the robotic sortation station where the sortation robot can interact with pods (e.g., to pick packages from pods) and carts (e.g., to place picked items into the carts)). The robot controller coordinates the arrival of carts and packages and manages the cart and pick walls for optimal utilization. The robot controller sends control instructions to the various robots to control their operation to optimize and coordinate cart/pod arrival times at the pick/walls of a given robotic sortation station.

The robotic picking and sortation systems described herein may receive a highly-variable stream of inbound items to be stored, picked (according to an order), processed, transported to robotic sortation stations by drive robots, and then sorted by robotic sortation devices (e.g., robotic "arms" and/or gantries) into destination pure containers. The number of physical containers that may be stationed at a robotic sortation device station may be limited due to spatial constraints (e.g., by physical constraints and/or by a reach of a stationary robotic arm). Since each such cart is intended to be destination pure such that all items are bound for the same downstream location, the robotic arm is controlled to place packages that are bound for the same location in the same target cart. In various examples, robotic workload data may describe pods and/or carts to be allocated to a particular robotic sortation station by a robot controller. Robotic workload data may reflect current orders in the system. An order may be associated with one or more items and/or packages to be located and sent to a specified destination.

In various examples, the robot controller described herein can allocate and deallocate robotic sortation resources to account for surges and/or lulls in packages bound for particular target destinations and can optimize robot utilization to minimize periods of downtime for robotic sortation resources.

Machine learning techniques, such as those described herein, are often used to form predictions, solve problems, recognize objects in image data for classification, etc. For example, computer vision techniques may be used to detect the target for a given item based on an address and/or code printed on a label of a package. Additionally, computer vision may be used to locate and pick up packages by robotic sortation devices in order to move the packages from one location to another and/or otherwise manipulate the objects. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 depicts a diagram illustrating a single floor robotic sortation system 100, according to various aspects of the present disclosure. The robotic sortation system 100 may be an example of a system that may be used for sortation in a fulfillment center, according to various aspects of the present disclosure. In the example of FIG. 1 single (or limited) instances of various buffers and robotic resources are shown for illustrative purposes; however, it should be noted that an actual sortation facility may include multiple such instances (e.g., tens, hundreds, or thousands), as further described below. In the example depicted in FIG. 1, items may have previously been packaged and/or labeled (e.g., labeled with destination labels that indicate a target destination for the individual labeled packages) and may be placed on an induct buffer. The induct buffer may store packages until such packages are picked up by robotic induct device 102 and placed into a pod. The pod may be carried by one of the robotic drives 144 and placed into a mobile buffer sortation field 106. The robotic drives 144 may be controlled wirelessly via control instructions from the robot controller 150 (not shown in FIG. 1).

The robot controller 150 may determine the appropriate time for a given robotic drive 144 to carry a pod to the pick wall 108 so that one or more packages on the pod carried by the robotic drive 144 may be sorted by robotic sortation device 110 and placed into a cart that has been assigned to the destination associated with the one or more packages. The pick wall 108 represents designated spatial locations that are accessible by the robotic sortation device 110. In some examples, the robot controller 150 may coordinate the arrival of the robotic drives 144 at the pick wall 108 such that the correct cart arrives from the cart field 112 at the same (or approximately the same) time. Coordination of the arrival of the pod with the cart enables the robotic sortation device 110 to select the package from the pod and place the package into the appropriate cart.

Although not explicitly labeled in FIG. 1, carts in the cart field 112 may be assigned destinations so as to be destination pure. Robotic drives 144 (or other robotic drives) may be directed by the robot controller 150 to carry specific carts to specific robotic sortation stations. As previously described, the robot controller 150 may coordinate the arrival of carts assigned to a destination with pods carrying packages bound for that same destination. Robotic drives 144 may rotate pods and carts at the robotic sortation station so that the robotic sortation device 110 may be in continuous or near continuous operation sorting packages into destination pure carts. Once a cart is full or is otherwise ready to be loaded onto a downstream system (e.g., onto a truck, freight, etc.). The robotic drive 144 may be controlled to move the cart from the robotic sortation station and/or the cart field 112 to the appropriate full cart eject station 114. The cart may be unloaded and the empty cart may be inducted back into the cart field 112. At this point, the robot controller 150 may assign a new destination to the cart and the cart may be carried by a robotic drive 144 to a robotic sortation station to be filled with packages bound for the new destination.

The cart field 112 may be conceptually thought of as a cart buffer, where empty and/or partially-filled carts are stored until a robotic drive receives control instructions to carry the carts to the cart wall of a robotic sortation station for further filling. Filled carts that are ready for downstream processing and/or unloading may traverse the cart field 112 in route to their respective downstream processing stations (e.g., full cart eject station 114). Similarly, the mobile buffer sort field 106 may be conceptually thought of as a package buffer where pods of packages are stored until a robotic drive receives control instructions to carry the pods to the pick wall 108 of a robotic sortation station. The robot controller 150 coordinates the arrival of the appropriate pods and carts at the appropriate robotic sortation station, as described in further detail below. In various examples, the single floor robotic sortation system 100 may be implemented on a single floor of a processing facility without requiring a second floor and/or mezzanine, reducing the complexity and cost of such facilities.

In the single floor robotic sortation system 100, the robotic drives 144 carrying both carts and pods have uncertain mission times to deliver a cart or a pod to the robotic sortation stations (e.g., the stations at which the robotic sortation devices 110 are disposed). Accordingly, the robot controller 150 described in further detail below manages requests (e.g., requests to send a particular package stored in a particular pod to a particular destination (the destination being assigned to a particular cart) so that the right packages/pods and carts/destinations are presented to the robotic sortation device 110 at the right time. The robot controller 150 also manages utilization of the cart wall and pick wall at the robotic sortation stations. In order to enable this functionality, the robot controller 150 may optimize the allocation of destinations to the robotic sortation stations, design station queues (for the pods/carts) to help buffer against mission time uncertainty, and optimize the work requests policies. Work requests refer to data representing a request to send a particular package/item (e.g., a package stored in a pod in the mobile buffer sort field 106) to a particular destination (e.g., a destination assigned to a particular cart in the cart field 112).

Robot controller 150 may map destinations to cart building stations and control the robotic drives 144 (to bring the appropriate destination carts and/or pods) according to the following optimization problem. It should be noted that this example optimization implementation is one example by which the robotic drives 144 and/or robotic sortation devices 110 may be controlled and other optimization implementations may be used in accordance with the desired implementation.

Let D be the set of destinations assignable to carts carried by robotic drives 144.

Let $n_d$ be the number of times destination d is duplicated.

Let $\tau$ be the robotic sortation station capacity.

Let I(s, d) be a station-destination to assignment variable mapping.

Let I(s) be a robotic sortation station to assignment variable mapping.

Let $p_i$ be the package-per-hour rate proportion expected from destination index i.

Let $S_v$ be the set of robotic sortation stations pre-mapped to segment v.

Let $c_{ds}$=1 if a cart for destination dis assigned to station s; $c_{ds}$=0 otherwise.

Let $x_{is}$=1 if destination index i is assigned to station s; $x_{is}$=0 otherwise.

The robot controller 150 may:

Minimize z (the set of destinations assigned to robotic sortation stations)

Subject to the constraints:

1) $\Sigma_{s\in S}\ \Sigma_{i\in I(s,d)} x_{is}=n_d\ \forall d\in D$

2) $\Sigma_{i\in I(s)} p_i x_{is}\le\tau\ \forall s\in S$

3) $\Sigma_{i\in I(s,d)} x_{is}\le c_{ds}\ \forall s\in S;\ \forall d\in D$

4) $\Sigma_{d\in D}\ c_{ds}\le z\ \forall s\in S$ $c_{ds}\in\{0, 1\}\ \forall d\in D;\ \forall s\in S$ $x_{is}\in\{0, 1\}\ \forall i\in I;\ \forall s\in S$ Constraint 1) may assign a target package volume for a destination and may determine if there are certain destinations that should be assigned to multiple robotic sortation stations.

Constraint 2) may provide a station capacity constraint, in terms of the number of carts/pods at a given robotic sortation station. Constraint 2 may be used to ensure that a robotic sortation device at a given robotic sortation station is not overwhelmed (thereby maintaining overall throughput).

Constraint 3) links assignments to carts by determining the number of destinations assigned to each robotic sortation station.

Constraint 4) is used to minimize the maximum number of destinations assigned to any robotic sortation station.

Figure 2A:
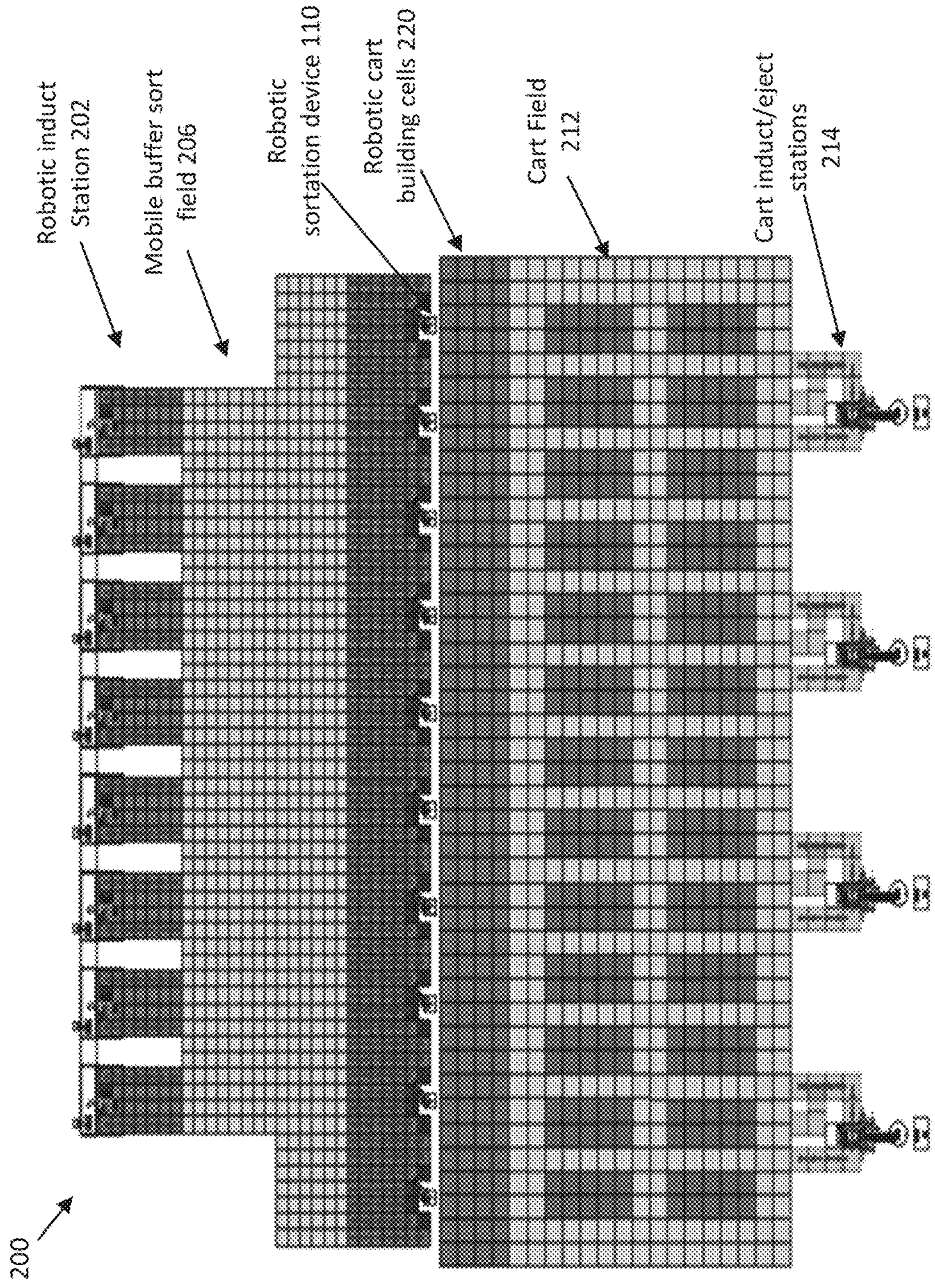
FIG. 2A is an overhead view of a first example sortation field, in accordance with various aspects of the present disclosure.

FIG. 2A is an overhead view of a first example sortation field 200, in accordance with various aspects of the present disclosure. The first example sortation field 200 may represent a push mode of operation wherein the robotic sortation devices 110 contend with packages as they arrive at the robotic cart building cells 220 and optimize the carts that are called from cart field 212 by robot controller 150 to the robotic cart building cells 220 at which the robotic sortation devices 110 sort packages from incoming pods into the appropriate destination carts. In the example push mode of FIG. 2A, pods may be carried by robots from the robotic induct stations 202 directly to the robotic sortation devices 110 (without storing the pods in static locations within the mobile buffer sort field 206). An example implementation of such dynamic cart requests at one robotic cart building cell/station 220 is described below in reference to FIG. 3A. In general, the robot controller 150 may solve the above optimization problem, subject to the constraints in order to assign a subset of destinations to the robotic sortation devices 110. Additionally, during push mode operation, a push mode policy may be used to provide the relevant control instructions to the drive robots in order to bring the appropriate destination-assigned carts to the appropriate robotic cart building cells 220.

Robotic induct station 202 represents a station at which packages are received and placed onto pods (e.g., robotic induct device 102 of FIG. 1). The pods are carried by robotic drives 144 through the mobile buffer sort field 206. During push mode operation, the pods may be carried by drives 144 through the mobile buffer sort field to the robotic cart building cells 220 without delay (e.g., without storing the pods in the mobile buffer sort field 206). The robot controller 150 provides control instructions to take the pods to specific robotic cart building cells 220. The robotic sortation devices 110 sort the packages into the appropriate destination-assigned carts at the robotic cart building cells 220. Robotic drives 144 bring carts from the cart field 212 to the robotic cart building cells 220 according to the packages arriving at the robotic cart building cells 220 and according to the constraints provided by the above optimization problem. Once a cart is full and/or is otherwise ready to unload, the robotic drives 144 carry the cart through the cart field 212 to the cart induct/eject stations 214 where the full carts may be unloaded (e.g., onto trucks) and the empty carts may be returned by robotic drives 144 to the cart field until the robot controller 150 again assigns a destination to the cart and sends control instructions to a robotic drive 144 to take the cart to a specific robotic cart building cell 220 to be loaded.

Figure 2B:
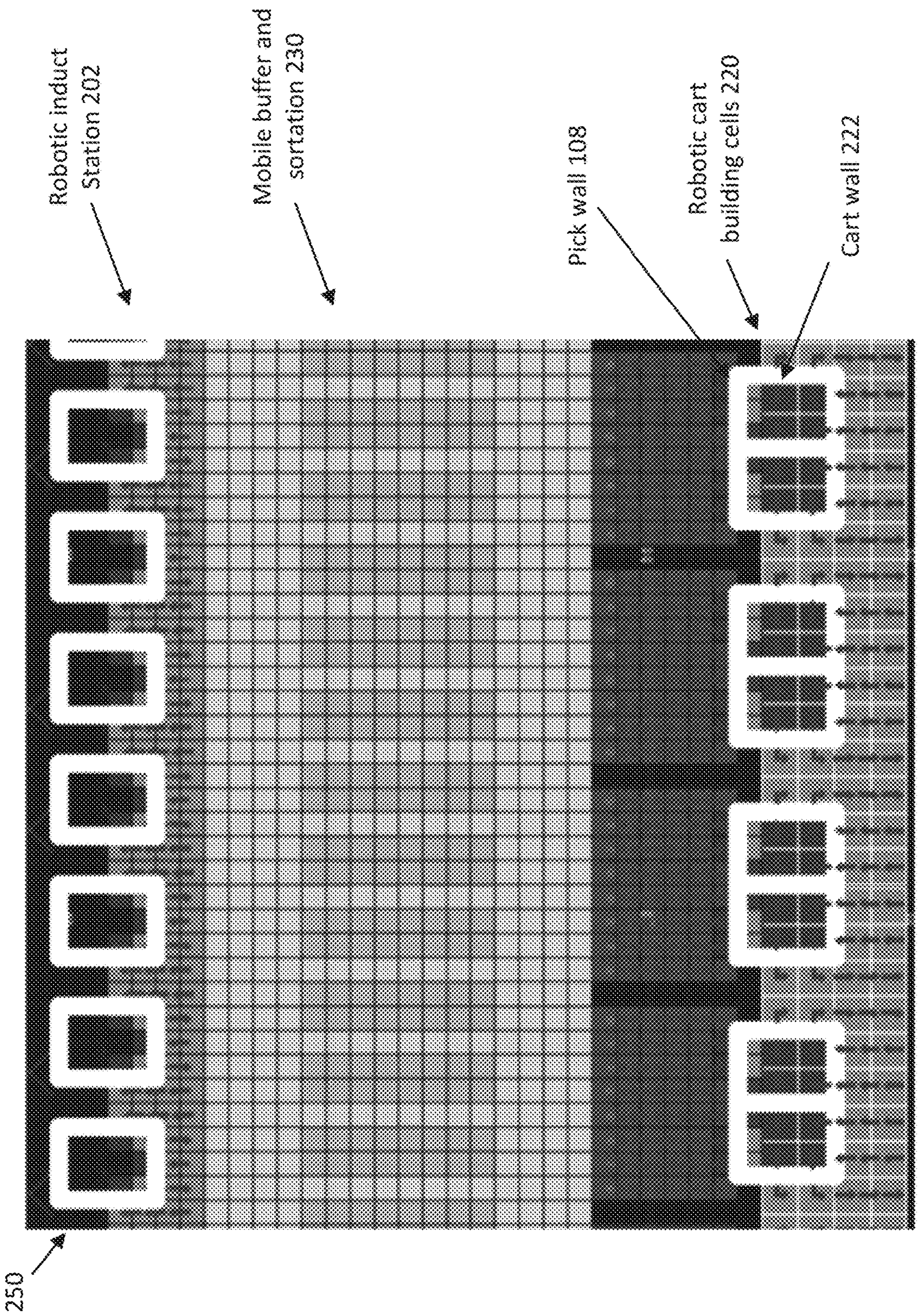
FIG. 2B is an overhead view of a second example sortation field, in accordance with various aspects of the present disclosure.

FIG. 2B is an overhead view of a second example sortation field 250, in accordance with various aspects of the present disclosure. The second example sortation field 250 may represent a pull mode of operation wherein the arrival of pods are coordinated with the arrival of destination-assigned carts that correspond to packages on the pods so that the correct carts are available at the correct time for the specific pods (at the robotic cart building cells 220). An example implementation of such dynamic cart and package requests at one robotic cart building cell/station 220 is described below in reference to FIG. 3B. In general, the robot controller 150 may solve the above optimization problem, subject to the constraints in order to provide the relevant control instructions to the drive robots in order to bring the appropriate pods and destination-assigned carts to the appropriate robotic cart building cells 220.

In the example of FIG. 2B, the pods are brought from the mobile buffer and sortation field 230 (where the pods may be stored for variable amounts of time) and are rotated into and out of the pick wall 108 while the carts are rotated into and out of the cart wall 222. Although not shown in FIG. 2B, full carts may be taken to the cart induct/eject stations 214 where the full carts may be unloaded (e.g., onto trucks) and the empty carts may be returned by robotic drives 144 to the cart field (not shown) until the robot controller 150 again assigns a destination to the cart and sends control instructions to a robotic drive 144 to take the cart to a specific robotic cart building cell 220 to be loaded.

Figure 3A:
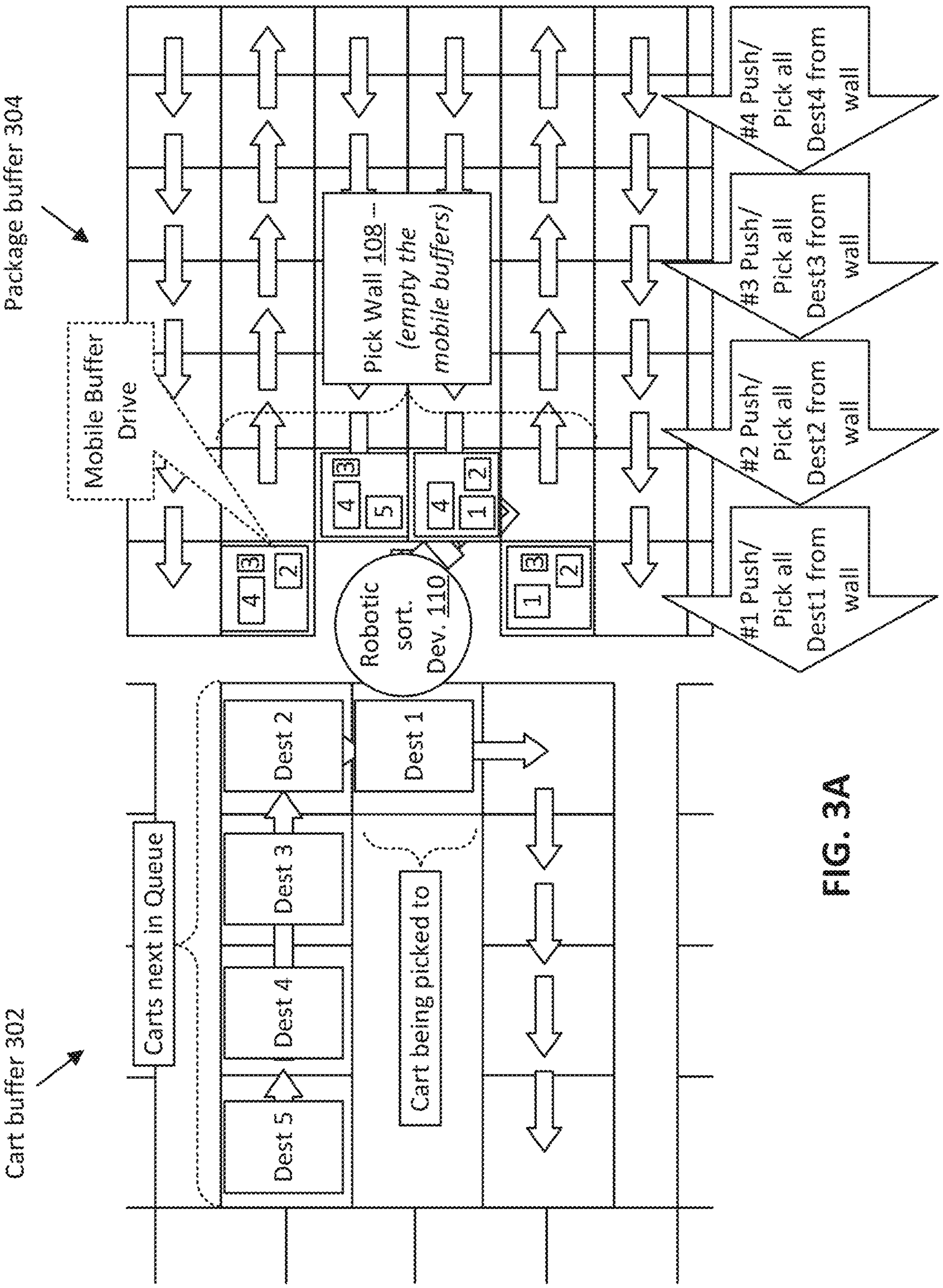
FIG. 3A is a diagram illustrating an example implementation of a robotic sortation station in which a cart buffer is coordinated to react to a pick wall of a package buffer, in accordance with various aspects of the present disclosure.

FIG. 3A is a diagram illustrating an example implementation of a robotic sortation station in which a cart buffer 302 is coordinated to react to a pick wall 108 of a package buffer 304, in accordance with various aspects of the present disclosure.

In this example implementation, no control is assumed over the package buffer 304. Instead, robotic drives 144 are controlled to bring carts to the cart queue in response to randomly arriving packages (e.g., from robotic induct device 102). The number of packages in the pick wall 108 create a cart queue dwell time that is long enough to absorb the cart-to-station mission time. With this in mind, the pick wall 108 comprises four cells (e.g., four positions at which the robotic sortation device 110 can pick from four different carts), which is larger than the cart wall (shown as one cell in FIG. 3A). The push mode policy may determine the number of packages bound for different destinations in the pick wall 108. The push mode policy may identify a destination among the packages on pick wall 108 that currently has no cart in queue and for which there is the greatest number of packages in the pods on the pick wall 108. Control instructions may be sent to a robot to bring a cart for that destination to the queue. For example, if there is only a cart assigned to destination 1 in the queue, and the destination with the greatest number of packages on the pick wall 108 for which there is no cart currently in queue is destination 2, control instructions may be sent to a robot to fetch and enqueue a cart associated with destination 2.

Figure 3B:
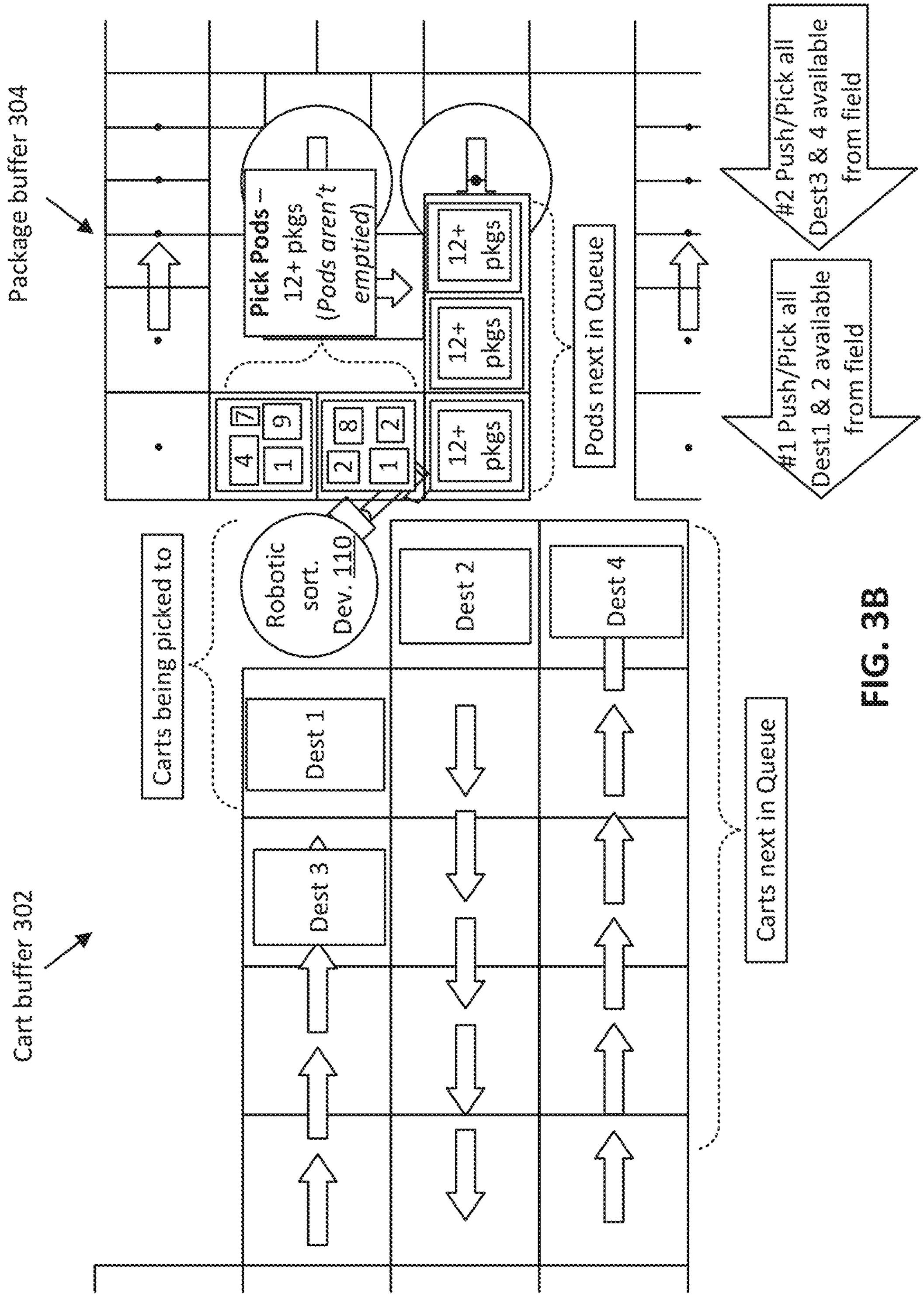
FIG. 3B is a diagram illustrating an example implementation of a robotic sortation station in which both the package and cart buffers are coordinated, in accordance with various aspects of the present disclosure.

FIG. 3B is a diagram illustrating an example implementation of a robotic sortation station in which both the package and cart buffers are coordinated, in accordance with various aspects of the present disclosure. In this example, the robot controller 150 requests both packages and carts (via control instructions to robotic drives 144) under mission time uncertainty. This design offers more control over package arrival/processing, which enables optimization for other objectives like package deadlines. The design maximizes the cart wall (2 cells—Dest. 1 and Dest. 2 in the example).

FIG. 8 displays examples of policies that may be used to coordinate cart and pod arrival for the architecture depicted in FIG. 3B. As depicted, for the subset of destinations assigned to a given robotic sortation station (e.g., assigned using the optimization problem described above), the cart request policy and mobile buffer (pod) request policy may be separately executed, according to different Scenarios 1-4. Other scenarios and policies may be used apart from those specifically shown. In Scenarios 1 and 2, the carts associated with the assigned subset of destinations arrive randomly to the robotic sortation station. The probability of selecting a destination cart is proportional to the volume according to the cumulative distribution function (CDF). In other words, higher volume destinations have higher probability of selection. In scenario 1, control instructions control robots to prioritize pods with the greatest number of packages for those destination carts that are at the robotic sortation station (or which are enqueued at the robotic sortation station). In scenario 2, control instructions control robots to prioritize pods with the oldest packages bound to the robotic sortation station.

In scenario 3, the cart request policy sends control instructions to robots to prioritize carts that contain the oldest package(s) (e.g., those which have been in buffers for the longest amount of time). Separately, control instructions instruct robots to carry pods that have the largest number of the packages with the same destination as the cart that contains the oldest package(s).

In scenario 4, the cart request policy sends control instructions to robots to prioritize carts that contain the oldest package(s) (e.g., those which have been in buffers for the longest amount of time). Separately, control instructions instruct robots to carry pods that contain the oldest package (s).

Figure 4:
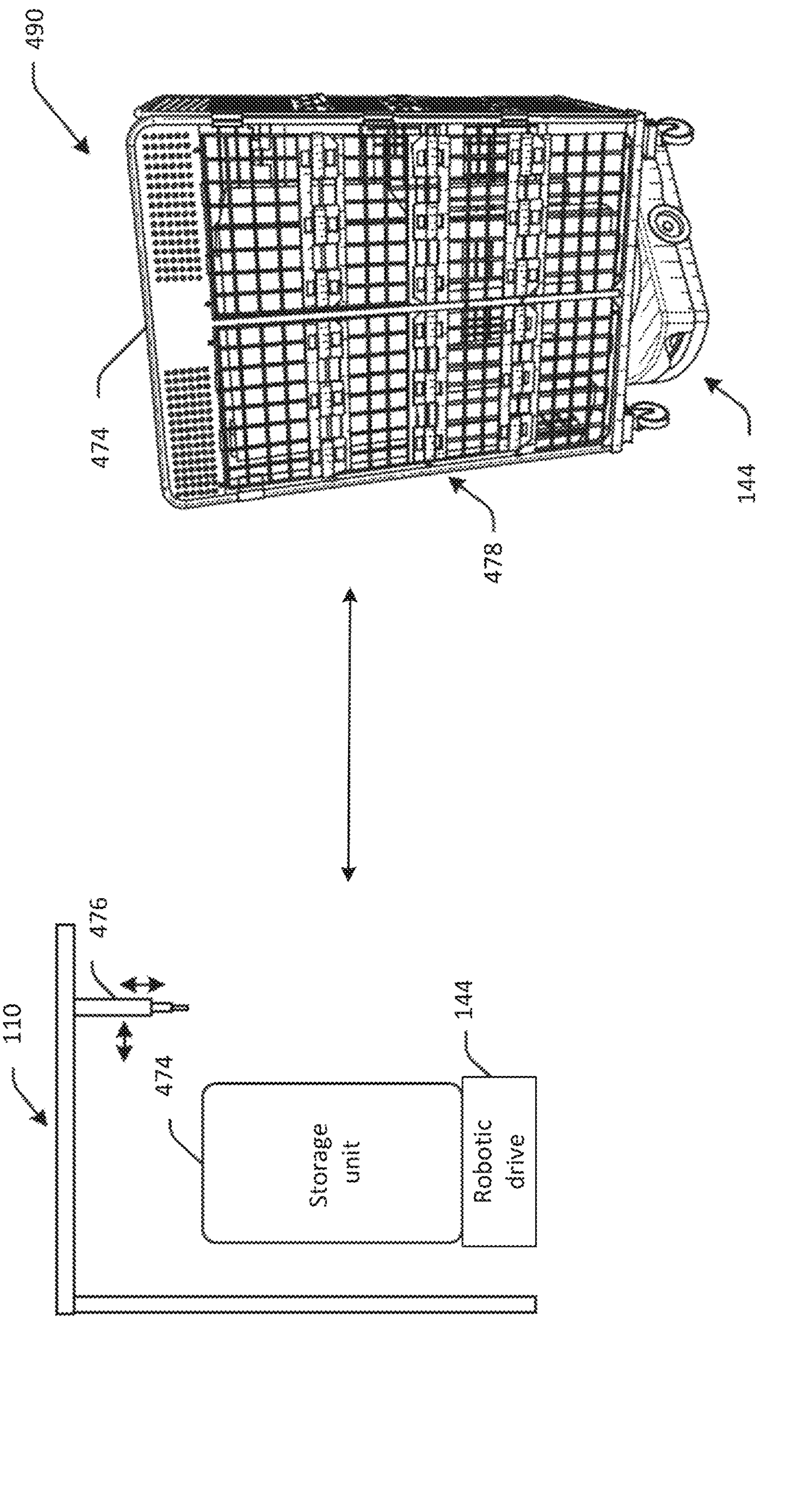
FIG. 4 is a diagram of a robotic sortation device that sorts items into target containers, in accordance with various embodiments described herein.

FIG. 4 is a diagram of a robotic sortation device 110 (e.g., a gantry device in this example) that sorts items into target carts such as mobile storage units, in accordance with various embodiments described herein. In FIG. 4, the packages may first be picked from an inbound pod (not shown).

As depicted in a side view, the robotic sortation device 110 may be positioned adjacent to the first storage unit 474 (e.g., a destination assigned cart). The robotic sortation device 110 may include a robotic manipulator 476 that is configured to grasp packages from the corresponding surface and to move the package into the first storage unit 474. The robotic manipulator 476 may include a linear actuator and/or telescoping arm with an end of arm tool that is used to grasp packages of different shapes, sizes, weights, and so forth. In other examples, the robotic manipulator 476 may instead by at the end of a hinged crane-like arm that may be controlled to grasp packages and place the packages into a destination pure container for which the robotic sortation device has been allocated in accordance with the various techniques described herein. The robotic manipulator 476 may have three degrees of freedom. For example, the robotic manipulator 476 may be configured to move the X-, Y-, and Z-axis directions. In some examples, the robotic manipulator 476 may not be able to rotate along a central axis of the actuator or telescoping arm, so as to simplify hardware. The robotic manipulator 476 may be coupled to a support that is coupled to a floor of the facility, or a support that is coupled to a moveable base, or to another type of support. If the robotic manipulator 476 is coupled to a moveable support instead of a permanent fixture, the robotic manipulator 476 may be used to service different moveable carts by repositioning the robotic manipulator 476. The robotic manipulator 476 may be configured to access the first storage unit 474 from a topside, or from above, without requiring the doors of the first cart to be opened, thereby further simplifying the loading process.

The robotic sortation device 110 may include a robotic drive 144 disposed at least partially under the first storage unit 474. The robotic drives 144 may be part of an autonomous robot. The robotic drives 144 may be configured to rotate the first storage unit 474 in different directions. Because the robotic drives 144 can rotate the first storage unit 474, rotational ability may not be needed at the robotic manipulator 476. However, in other examples, the robotic sortation device may rotate 360 degrees to place packages into different storage units at the container build station. The robotic drives 144 may be disposed under an individual container. Different robotic platforms may be used for different containers.

As depicted in isolated view 490, the first storage unit 474 may have doors 478 that can open by swinging outwards. Because the robotic manipulator 476 can access the first storage unit 474 from above or from a topside, the doors 478 can remain closed during loading. The robotic manipulator 476 may be a moveable robotic manipulator that can be moveably positioned adjacent to different carts. As previously described, the robotic sortation device 110 may be positioned at a container build station. There may be designated positions for robotic drives 144 to bring storage units 474 to the container build station. Each storage unit 474 may be designated to a target destination for which the robotic sortation device 110 has been allocated using the various techniques described herein. Accordingly, the robotic sortation device 110 may place packages bound for a particular target destination into the mobile storage unit that is associated with that target destination. When the storage unit is full (e.g., above a threshold cart utilization), the robotic drive 144 may remove the storage unit and a different robotic drive 144 may bring an empty storage unit for further container build operation.

The robotic sortation device 110 may be in communication with one or more sensors, such as cameras, used to capture images of the contents of the first storage unit 474 and/or to determine the target destination for a particular package. The image data may be used to determine positioning for a package and/or to scan labels of the package to identify the target destination for a package so that the robotic sortation device may place the package into a destination pure container for which the robotic sortation device has been allocated. The package may be positioned in the predetermined position via movement of the robotic manipulator 476 after the package is grasped. Additionally, sensors such as the one or more cameras may monitor the storage units "fullness" to determine the cart utilization.

The robotic sortation device 110 may include an autonomous robot controlling the robotic arm. The robotic drive 144 may be configured to rotate storage units (e.g., carts) from a first orientation to a second orientation. The robotic drive 144 may be configured to rotate carts at least 180 degrees. The robotic sortation device 110 may include the robotic manipulator 476 that has a linear actuator or other actuator and an end of arm tool. The robotic manipulator may be configured to (i) retrieve a first package from a first surface and to position the first package inside the first cart at a first predetermined position without opening the first door, and (ii) retrieve a second package from a second surface and to position the second package inside the second cart at a second predetermined position without opening the second door. The robotic manipulator 476 accesses the carts from a top side. The robotic sortation device 110 may include or may be in communication with, a first camera configured to image an interior of the first cart, and a second camera configured to image an interior of the second cart.

Figure 5:
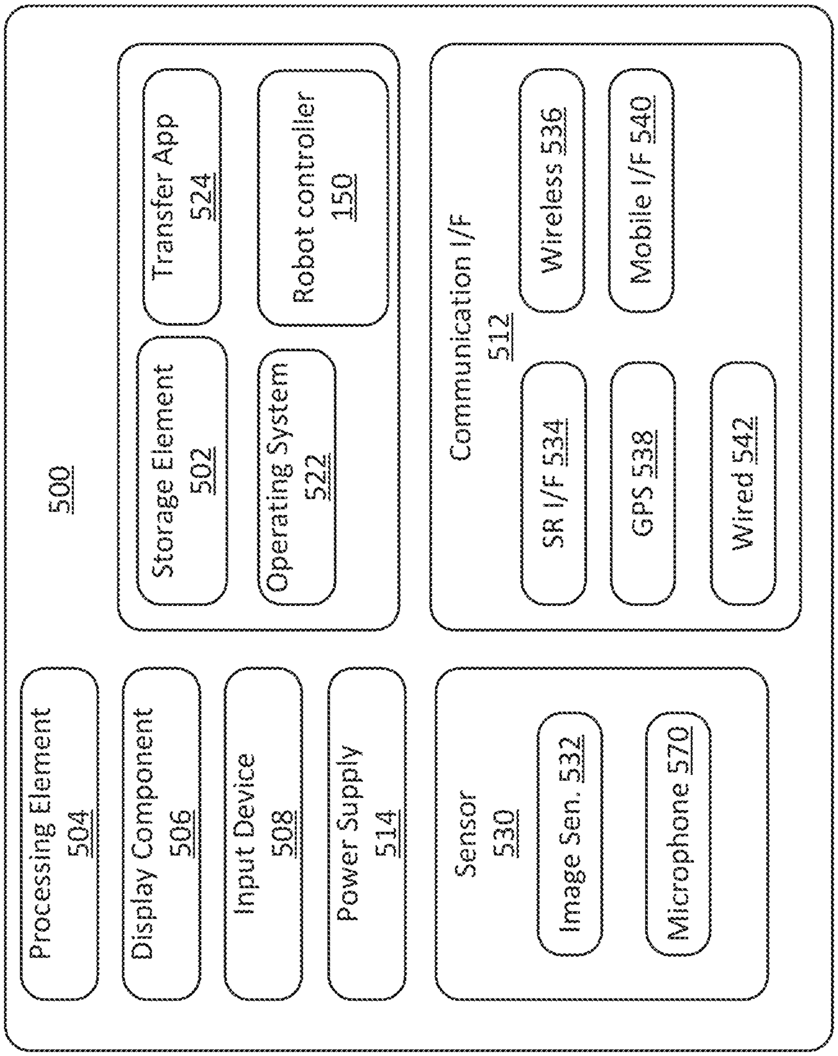
FIG. 5 is an example computing device architecture that may be used in accordance with various techniques described herein.

FIG. 5 is a block diagram showing an example architecture 500 of a computing device that may be used in accordance with various aspects of the present disclosure. For example, the robot controller 150 may comprise one or more components of the architecture 500 (or the architecture 500 may include the robot controller 150, as shown). It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store computer-executable instructions configured to implement the robot controller 150 described herein. The robot controller 150 may dynamically allocate robotic resources (e.g., robotic drives 144) to bring various pods/carts to robotic sortation stations based on current and/or predicted processing/sorting needs.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images generated in accordance with the various techniques described herein. In various examples, the display component 506 may be a wearable display (e.g., in a headset, goggles, and/or glasses) that may display the various graphical highlight data, graphical navigational hints, text, other graphical data, etc., described herein. In some examples, the architecture 500 may include one or more speakers effective to output audio.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In various examples, the image sensor 532 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 6:
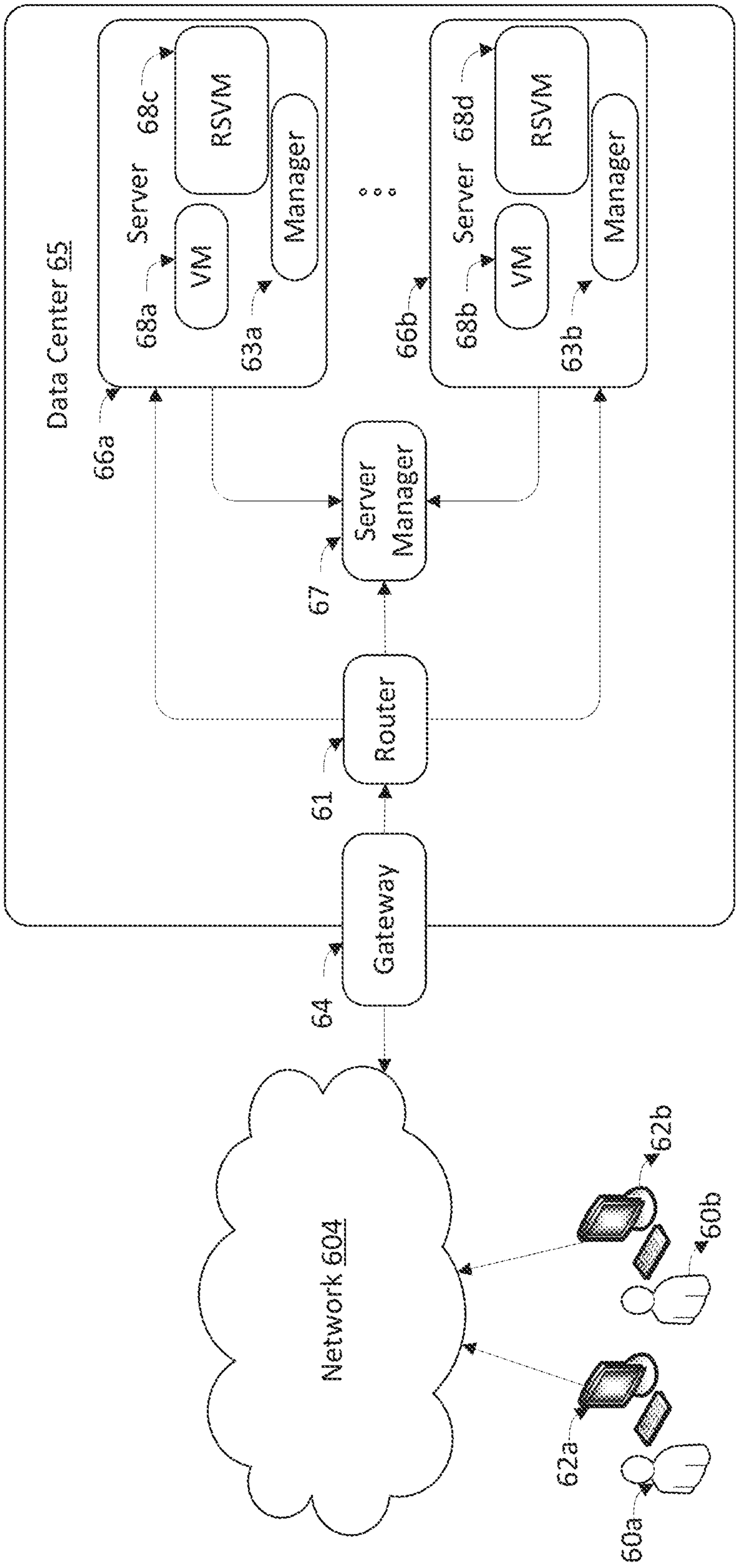
FIG. 6 is a diagram illustrating an example system for sending and providing data that may be used in accordance with the present disclosure.

An example system for sending and providing data that may be used to perform one or more of the various techniques described herein will now be described in detail. In particular, FIG. 6 illustrates an example computing environment in which the embodiments described herein may be implemented. For example, the computing environment of FIG. 6 may be configured to dynamically allocate robotic resources as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via a computer communication network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources-consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 604. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
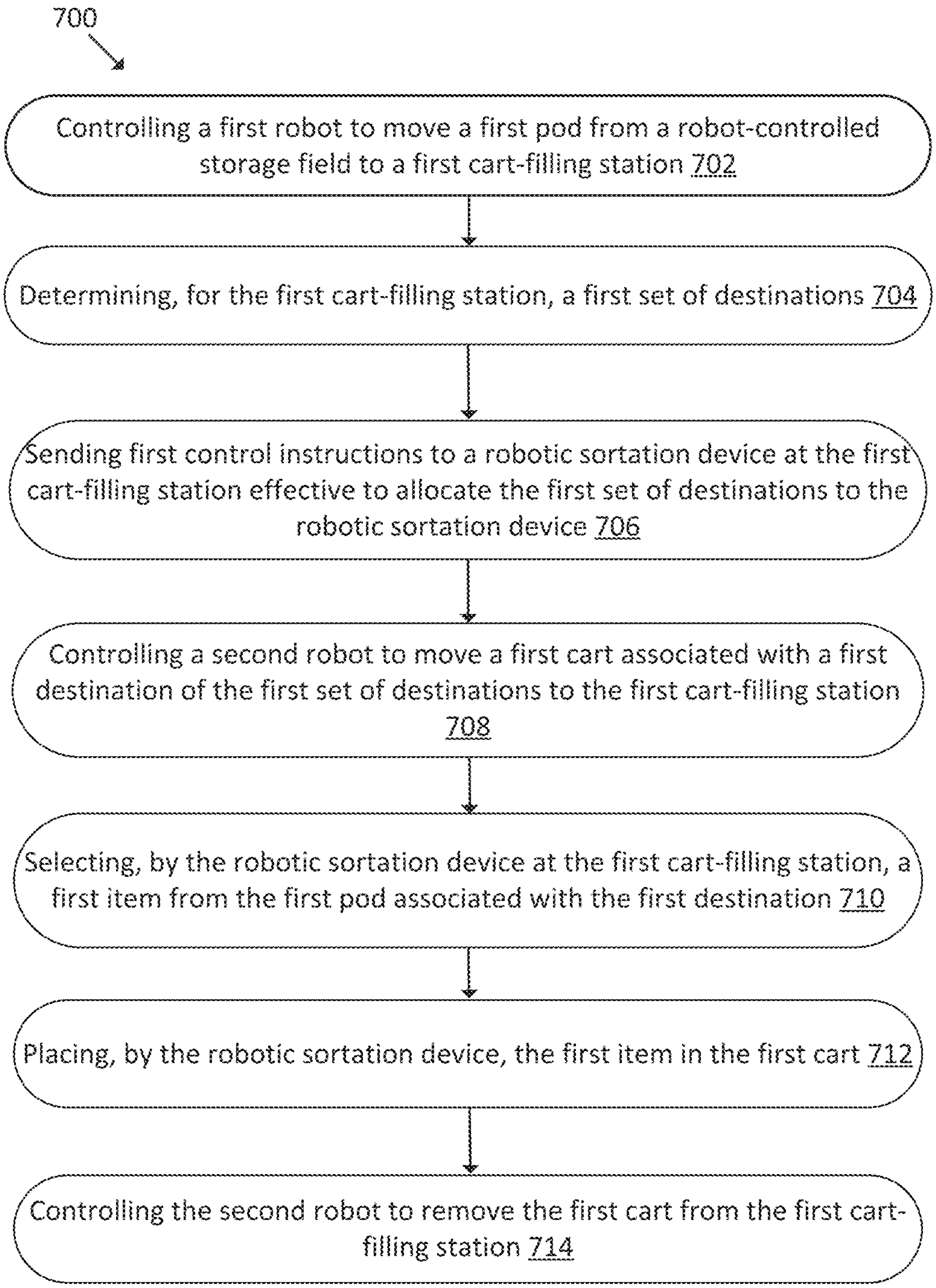
FIG. 7 is an example process that may be used to implement a robotic cart-build controller for sortation, in accordance with various examples of the present disclosure.

FIG. 7 is an example process 700 that may be used to implement a robotic cart-build controller for sortation, in accordance with various examples of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 702, at which a first robot may be controlled to move a first pod from a robot-controlled storage field to a first cart-filling station. For example, a robotic drive 144 may be controlled by robot controller 150 to carry the first pod from its location in the robot-controlled storage field (e.g., mobile buffer sort field 206) to a first cart-filling station (e.g., a robotic cart building cell 220).

Processing may continue at action 704, at which a first set of destinations may be determined for the first cart-filling station. For example, a set of destinations may be dynamically assigned to a particular robotic cart building cell 220 by the robot controller 150 according to the optimization problem described herein. In various examples, the optimization problem may minimize the number of destinations assigned to a given robotic cart building cell 220 while maintaining the throughput.

Processing may continue at action 706, at which first control instructions may be sent by the robot controller 150 to a robotic sortation device at the first cart-filling station. The first control instructions may be effective to allocate the first set of destinations to the robotic sortation device. Processing may continue at action 708, at which a second robot (e.g., a different robotic drive 144) may be controlled to move a first cart associated with a first destination of the first set of destinations to the cart-filling station.

Processing may continue at action 710, at which the robotic sortation device at the first cart-filling station may select a first item from the first pod associated with the first destination. Processing may continue at action 712, at which the robotic sortation device (e.g., a robotic arm, a robotic gantry, etc.) may place the first item in the first cart. Processing may continue to action 714, at which the second robot may be controlled (e.g., via control instructions sent to the appropriate robotic drive 144) to remove the first cart from the first cart-filling station.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

determining a first set of destinations associated with a first set of items;

sending first control instructions to a robotic sortation device at a first cart-filling station, the first control instructions effective to allocate a subset of destinations of the first set of destinations to a robotic sortation device, wherein the subset of destinations are selected such that a total number of destinations assigned to any robotic sortation device of a plurality of robotic sortation devices is minimized subject to a first throughput constraint;

controlling a first robot to move a first pod from a robot-controlled storage field to the first cart-filling station, the first pod containing a first item;

determining, based at least in part on a first arrival time of the first robot at the first cart-filling station, a queue dwell time that is long enough to absorb a cart-to-station mission time;

controlling a second robot to move a first cart associated with a first destination of the subset of destinations to the first cart-filling station based at least in part on a determination that the first arrival time of the first robot at the first cart-filling station corresponds to a second arrival time of the second robot at the first cart-filling station and that the second arrival time does not exceed the queue dwell time of the first robot;

sending second control instructions to the robotic sortation device, the second control instructions effective to cause the robotic sortation device to select the first item associated with the first destination;

controlling the second robot to remove the first cart from the first cart-filling station;

controlling a third robot to move a second cart associated with a second destination of the subset of destinations to the first cart-filling station; and sending third control instructions to the robotic sortation device, the third control instructions effective to cause the robotic sortation device to select a second item associated with the second destination from the first pod brought to the first cart-filling station by the first robot.

2. The method of claim 1, further comprising:

sending, from a computer-executed controller, fourth control instructions effective to cause the first robot to bring the first pod to the first cart-filling station according to a time associated with the first item.

3. The method of claim 1, further comprising:

determining a respective set of destinations to allocate to each cart-filling station of a plurality of cart-filling stations, wherein a size of the respective set of destinations allocated to each cart-filling station is minimized subject to a throughput of the plurality of cart-filling stations.

4. A method comprising:

determining, for a first cart-filling station, a subset of destinations of a first set of destinations;

sending first control instructions to a robotic sortation device at the first cart-filling station, the first control instructions effective to allocate the subset of destinations to the robotic sortation device;

controlling a first robot to move a first pod from a robot-controlled storage field to the first cart-filling station, the first pod containing a first item;

determining, based at least in part on a first arrival time of the first robot at the first cart-filling station, a queue dwell time that is long enough to absorb a cart-to-station mission time;

controlling a second robot to move a first cart associated with a first destination of the subset of destinations to the first cart-filling station based at least in part on a determination that the first arrival time of the first robot at the first cart-filling station corresponds to a second arrival time of the second robot at the first cart-filling station and that the second arrival time does not exceed the queue dwell time of the first robot;

selecting, by the robotic sortation device at the first cart-filling station, the first item from the first pod;

placing, by the robotic sortation device, the first item in the first cart; and controlling the second robot to remove the first cart from the first cart-filling station.

5. The method of claim 4, further comprising:

controlling a third robot to move a second cart associated with a second destination of the subset of destinations to the first cart-filling station;

selecting, by the robotic sortation device at the first cart-filling station, a second item from the first pod associated with the second destination;

placing, by the robotic sortation device, the second item in the second cart; and controlling the third robot to remove the second cart from the first cart-filling station.

6. The method of claim 4, further comprising:

determining a respective subset of destinations to allocate to each cart-filling station of a plurality of cart-filling stations, wherein a size of the respective subset of destinations allocated to each cart-filling station is minimized subject to a throughput of the plurality of cart-filling stations.

7. The method of claim 4, further comprising:

selecting the first robot to move the first pod from a robot-controlled storage field to the first cart-filling station based at least in part on a first deadline associated with the first item; and coordinating, by a computer-executed controller, a first arrival of the second robot with a second arrival of the first robot.

8. The method of claim 4, further comprising:

determining, by a computer-executed controller, a second destination associated with a second item disposed in a second pod disposed at the first cart-filling station; and sending second control instructions to a third robot to move a second cart associated with the second destination to the first cart-filling station based at least in part on the second destination being associated with the second item in the second pod disposed at the first cart-filling station.

9. The method of claim 4, wherein the subset of destinations are allocated to the first cart-filling station at a first time based on first robotic workload data, the method further comprising:

determining, at a second time, a second subset of destinations for the first cart-filling station based on second robotic workload data determined after the first time; and sending second control instructions to the robotic sortation device at the first cart-filling station, the second control instructions effective to allocate the second subset of destinations to the robotic sortation device.

10. The method of claim 4, further comprising:

determining, for a second cart-filling station, a second subset of destinations different from the subset of destinations; and controlling a third robot to move a second cart assigned to a second destination of the second subset of destinations to the second cart-filling station based at least in part on the second destination being among the second subset of destinations allocated to the second cart-filling station.

11. The method of claim 4, further comprising:

controlling the first robot to move the first pod from a robot-controlled storage field to the first cart-filling station based on a first deadline associated with the first item; and prioritizing a first arrival of the second robot over a second arrival of a third robot at the first cart-filling station based at least in part on the first deadline.

12. The method of claim 4, further comprising:

determining a station capacity constraint, wherein a number of carts or a number of pods at the robotic sortation device is based on the station capacity constraint.

13. A system comprising:

at least one processor; and non-transitory computer-readable memory storing instructions that, when executed by the at least one processor is effective to:

determine, for a first cart-filling station, a subset of destinations of a first set of destinations;

send first control instructions to a robotic sortation device at the first cart-filling station, the first control instructions effective to allocate the subset of destinations to the robotic sortation device;

control a first robot to move a first pod from a robot-controlled storage field to the first cart-filling station, the first pod containing a first item;

determining, based at least in part on a first arrival time of the first robot at the first cart-filling station, a queue dwell time that is long enough to absorb a cart-to-station mission time;

control a second robot to move a first cart associated with a first destination of the subset of destinations to the first cart-filling station based at least in part on a determination that the first arrival time of the first robot at the first cart-filling station corresponds to a second arrival time of the second robot at the first cart-filling station and that the second arrival time does not exceed the queue dwell time of the first robot;

select, by the robotic sortation device at the first cart-filling station, the first item from the first pod;

place, by the robotic sortation device, the first item in the first cart; and control the second robot to remove the first cart from the first cart-filling station.

14. The system of claim 13, the non-transitory computer-readable memory storing further instructions that, when executed by the at least one processor, are further effective to:

control a third robot to move a second cart associated with a second destination of the subset of destinations to the first cart-filling station;

select, by the robotic sortation device at the first cart-filling station, a second item from the first pod associated with the second destination;

place, by the robotic sortation device, the second item in the second cart; and control the third robot to remove the second cart from the first cart-filling station.

15. The system of claim 13, the non-transitory computer-readable memory storing further instructions that, when executed by the at least one processor, are further effective to:

determine a respective subset of destinations to allocate to each cart-filling station of a plurality of cart-filling stations, wherein a size of the respective subset of destinations allocated to each cart-filling station is minimized subject to a throughput of the plurality of cart-filling stations.

16. The system of claim 13, the non-transitory computer-readable memory storing further instructions that, when executed by the at least one processor, are further effective to:

select the first robot to move the first pod from a robot-controlled storage field to the first cart-filling station based at least in part on a first deadline associated with the first item; and coordinate, by a computer-executed controller, a first arrival of the second robot with a second arrival of the first robot.

17. The system of claim 13, the non-transitory computer-readable memory storing further instructions that, when executed by the at least one processor, are further effective to:

determine, by a computer-executed controller, a second destination associated with a second item disposed in a second pod disposed at the first cart-filling station; and send second control instructions to a third robot to move a second cart associated with the second destination to the first cart-filling station based at least in part on the second destination being associated with the second item in the second pod disposed at the first cart-filling station.

18. The system of claim 13, wherein the subset of destinations are allocated to the first cart-filling station at a first time based on first robotic workload data, and wherein the non-transitory computer-readable memory stores further instructions that, when executed by the at least one processor, are further effective to:

determine, at a second time, a second subset of destinations for the first cart-filling station based on second robotic workload data determined after the first time; and send second control instructions to the robotic sortation device at the first cart-filling station, the second control instructions effective to allocate the second subset of destinations to the robotic sortation device.

19. The system of claim 13, the non-transitory computer-readable memory storing further instructions that, when executed by the at least one processor, are further effective to:

determine, for a second cart-filling station, a second subset of destinations different from the subset of destinations; and control a third robot to move a second cart assigned to a second destination of the second subset of destinations to the second cart-filling station based at least in part on the second destination being among the second subset of destinations allocated to the second cart-filling station.

20. The system of claim 13, the non-transitory computer-readable memory storing further instructions that, when executed by the at least one processor, are further effective to:

determine a station capacity constraint, wherein a number of carts or a number of pods at the robotic sortation device is based on the station capacity constraint.

* * * * *